US011960291B2

(12) United States Patent
Rudenko et al.

(10) Patent No.: US 11,960,291 B2
(45) Date of Patent: Apr. 16, 2024

(54) COMPUTER-IMPLEMENTED METHOD AND DEVICE FOR CONTROLLING A MOBILE ROBOT BASED ON SEMANTIC ENVIRONMENT MAPS

(71) Applicant: Robert Bosch GmbH, Stuttgart (DE)

(72) Inventors: Andrey Rudenko, Gerlingen (DE); Johannes Maximilian Doellinger, Leonberg (DE); Kai Oliver Arras, Stuttgart (DE); Luigi Palmieri, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 280 days.

(21) Appl. No.: 17/345,521

(22) Filed: Jun. 11, 2021

(65) Prior Publication Data

US 2022/0048187 A1 Feb. 17, 2022

(30) Foreign Application Priority Data

Aug. 12, 2020 (EP) ..................................... 20190610

(51) Int. Cl.
*G05D 1/02* (2020.01)
*G05D 1/00* (2006.01)
*B25J 9/16* (2006.01)

(52) U.S. Cl.
CPC .......... *G05D 1/0221* (2013.01); *G05D 1/0214* (2013.01); *B25J 9/163* (2013.01); *B25J 9/1664* (2013.01); *G05D 1/0274* (2013.01)

(58) Field of Classification Search
CPC ....... B25J 9/1664; B25J 9/163; G05D 1/0214; G05D 1/0221; G05D 1/0274;
(Continued)

(56) References Cited

U.S. PATENT DOCUMENTS 11,620,576 B1 * 4/2023 Tao .................... G06N 20/20
                                                             706/12
2010/0274387 A1 10/2010 Pitzer
(Continued)

OTHER PUBLICATIONS

Wigness, M., et al., "Robot Navigation from Human Demonstration: Learning Control Behaviors," May 2018, 2018 IEEE International Conference on Robotics and Automation (ICRA), pp. 1150-1157 (Year: 2018).*

(Continued)

*Primary Examiner* — Abby Y Lin
*Assistant Examiner* — Karston G. Evans
(74) *Attorney, Agent, or Firm* — NORTON ROSE FULBRIGHT US LLP; Gerard A. Messina

(57) ABSTRACT

A computer-implemented method for determining a motion trajectory for a mobile robot based on an occupancy prior indicating probabilities of presence of dynamic objects and/or individuals in a map of an environment. Occupancy priors are determined by a reward function defined by reward function parameters. The determining of the reward function parameters includes: providing semantic maps; providing training trajectories for each of semantic maps; computing a gradient as a difference between an expected mean feature count and an empirical mean feature count depending on each of the semantic maps and on each of the training trajectories, the empirical mean feature count is the average number of features accumulated over the provided training trajectories of the semantic maps, wherein the expected mean feature count is the average number of features accumulated by trajectories generated depending on the current reward function parameters; and updating the reward function parameters depending on the gradient.

10 Claims, 5 Drawing Sheets

(58) Field of Classification Search
CPC ... G05D 2201/0203; G05D 2201/0208; G05D 1/0217; G06F 30/27; G06F 17/15; G06F 17/18; G06F 40/30
See application file for complete search history.

(56) References Cited

U.S. PATENT DOCUMENTS

| | | |
|---|---|---|
| 2019/0219401 A1 | 7/2019 | Daniilidis et al. |
| 2020/0039081 A1 | 2/2020 | Deyle et al. |
| 2020/0241574 A1* | 7/2020 | Lin ..................... G05D 1/0016 |
| 2022/0057804 A1* | 2/2022 | Hasegawa ............ G05D 1/0223 |

OTHER PUBLICATIONS

Everett, M., et al., "Planning Beyond the Sensing Horizon Using a Learned Context," Nov. 2019, 2019 IEEE/RSJ International Conference on Intelligent Robots and Systems (IROS), pp. 1064-1071 (Year: 2019).*

Wang, T., et al., "Learning Navigation Costs from Demonstration with Semantic Observations", Jun. 2020, Proceedings of Machine Learning Research vol. 120, pp. 1-11, (Year: 2020).*

Saleh K., et al., "Contextual Recurrent Predictive Model for Long-Term Intent Prediction of Vulnerable Road Users", Aug. 2020, IEEE Transactions on Intelligent Transportation Systems, vol. 21, No. 8, pp. 3398-3408 (Year: 2020).*

Kitani et al., "Activity Forecasting," European Conference on Computer Vision, Vision (ECCV), Springer, 2012, pp. 201-214. <https://link.springer.com/content/pdf/10.1007%2F978-3-642-33765-9_15.pdf> Downloaded Jun. 9, 2021.

* cited by examiner

COMPUTER-IMPLEMENTED METHOD AND DEVICE FOR CONTROLLING A MOBILE ROBOT BASED ON SEMANTIC ENVIRONMENT MAPS

The project leading to this application has received funding from the European Union's Horizon 2020 research and innovation programme under grant agreement No 732737.

CROSS REFERENCE

The present application claims the benefit under 35 U.S.C. § 119 of European Patent Application No. EP 20190610.4 filed on Aug. 12, 2020, which is expressly incorporated herein by reference in its entirety.

FIELD

The present invention relates to modeling an optimized trajectory of a mobile robot for controlling a mobile robot to move in an environment.

BACKGROUND INFORMATION

In environments, mobile robots, such as mobile service robots, intelligent vehicles, collaborative production assistance, video surveillance, urban city planning and the like share the environment with other dynamic objects and individuals. For motion planning of a mobile robot, human motion in the environment is influenced by many factors that have to be evaluated. While indoor human navigation is merely motivated by avoiding collisions, semantic segmentation has a strong impact in outdoor environments.

For controlling the movement of a mobile robot in a crowded environment, usually a reward function is developed, which reflects the movement of individuals and other dynamic objects in the environment. The reward function may usually form a basis for determining an optimal motion policy for the mobile robot as it can be used to estimate average occupancy values for given environment maps and to simulate a trajectory in a new environment. The average occupancy values are then used to determine a motion trajectory and finally to control the motion of the mobile robot.

However, determining the reward function based on available data is difficult. Therefore, a so-called inverse optimal control (IOC) approach is used to uncover the reward function that best explains a demonstrated optimal behavior of the mobile robot. Basically, in inverse optimal control the reward function is learnt by demonstrations of the behavior of the mobile robot.

Inverse Optimal Control (IOC) approaches make use of semantic maps for predicting future human motion as, e.g., described in Kitani, K. M., Ziebart, B. D., Bagnell, J. A., Hebert, M.: "Activity forecasting", Proc. of the Europ. Conf. on Comp. Vision (ECCV). pp. 201-214 (2012). In particular, semantic maps are used for encoding the features of the reward function. However, such application of IOC does not generalize well to new environments or heterogeneous datasets with different geometries.

SUMMARY

According to the present invention, a method for performing an inverse optimal control of a mobile robot using a reward function determined by semantic maps for predicting future human motion and a device and a mobile robot are provided.

Further embodiments of the present invention are disclosed herein.

According to a first aspect of the present invention, a computer-implemented method for determining a motion trajectory of a robot based on an occupancy prior indicating probabilities of a presence of dynamic objects and/or individuals in a map of an environment is provided, wherein the occupancy priors are determined by means of a reward function defined by reward function parameters. In accordance with an example embodiment of the present invention, the determining of the reward function parameters comprises the steps of:

providing a number of semantic maps;
providing a number of training trajectories for each of the number of semantic maps;
computing a difference between an expected mean feature count and an empirical mean feature count depending on each of the number of semantic maps and on each of the number of training trajectories, wherein the empirical mean feature count is the average number of features accumulated over the training trajectories of the semantic maps, wherein the expected mean feature count is the average number of features accumulated by trajectories generated depending on the current reward function parameters;
updating the reward function parameters depending on the difference.

While conventional methods for predicting future trajectories are based on current observations of moving individuals, above method will assess semantic environments regardless of individual tracks. Above approach explicitly uses only semantic maps as input which allows to adapt the learned models to new environments without further adaptation.

A trajectory as understood herein is a planned path of a motion a robot may move along or a part of a robotic device, such as a manipulator, may be moved.

Particularly, an inverse optimal control method is further developed to learn semantic preferences across a wide selection of diverse environment maps. The learned preferences are then used to simulate trajectories and infer the occupancy map of a newly given environment. The occupancy map of the new environment can then be used to optimize a motion trajectory of a mobile robot.

Inverse reinforcement learning assumes that the observed motion of individuals in a given environment is generated by a stochastic motion policy and seeks to estimate this policy with maximum likelihood to the available demonstrations. The motion policy follows directly from a reward function and can be used to simulate trajectories in newly provided environments. The simulations, however, depend on the distributions from which the start and goal states for the simulated trajectories are drawn, wherein the probabilities to sample the start or the goal state are directly learnt conditioned on the semantic class of the state.

The features as described herein in accordance with an example embodiment of the present invention are used to semantically describe the environment. The semantic maps are used for encoding the features of the reward function.

In accordance with an example embodiment of the present invention, it may be provided that the determining of the reward function parameters is iteratively performed based on a number of respectively different semantic maps.

So, the reward function may be updated in an iterative procedure using a number of given semantic environment maps in each iteration.

Moreover, the reward function may indicate how much a physical scene feature affects the action of the dynamic objects and/or individuals.

According to an example embodiment of the present invention, the expected mean feature count may be successively developed by a backward-pass process and a forward-pass process for each of the training trajectories of each of the number of semantic maps as also described by Kitani, K. M., Ziebart, B. D., Bagnell, J. A., Hebert, M.: "Activity forecasting", Proc. of the Europ. Conf. on Comp. Vision (ECCV). pp. 201-214 (2012).

Furthermore, in accordance with an example embodiment of the present invention, the backward-pass process may be configured to use the current reward function parameters to compute the expected reward of a trajectory to a goal state of the considered training trajectory from any initial state, wherein a maximum entropy policy may be applied.

Therefore, in the backward pass, a state value function for each state in the currently considered semantic map given the goal state is computed using the current reward function. Then, a stochastic motion policy to reach the goal state is then computed. The stochastic motion policy is used in a forward pass to simulate several trajectories.

In accordance with an example embodiment of the present invention, it may be provided that the forward-pass process a trajectory is built based on the stochastic motion policy determined by the preceding backward-pass process while the built/generated trajectory is used to update a visitation count for each state of the built trajectory.

In accordance with an example embodiment of the present invention, an expected mean feature count is computed as a weighted sum of the visitation counts based on the simulated trajectories. Further, an empirical mean feature count is determined based on randomly generated trajectories for the semantic maps. The empirical mean feature count represents accumulated occupancies frequencies of generated trajectories (provided random start and goal states) through the given semantic maps for the current iteration.

The reward function may be updated using a gradient descent depending on the empirical mean feature count and the expected mean feature count until the gradient converges to zero. This is to update the reward function used for generating the trajectories in the backward-forward process.

In contrast to other approaches, the database of trajectories in given environments can be used to count visitation frequencies in each state of the environment to obtain the occupancy map.

The above method estimates the distribution in environments where no human trajectory data is available.

The conventional Inverse Optimal Control algorithm has a difficulty converging to the optimal parameters of the reward function when trained on a set of heterogeneous semantic maps. In fact, unless two different semantic maps have exactly the same empirical feature count, the optimal reward function parameters will be different, and the usually applied gradient descent fails to converge, oscillating between two local minima. To be compatible with training on multiple semantic maps, the backward-forward algorithm is modified by performing the backward and forward passes for a batch of trajectories in a batch of semantic maps, accumulating the visitation counts across several maps. This modification enables generalization on maps with variable feature count and prevents oscillation of the reward function parameters between optimal solutions of each individual map.

Moreover, the generating of the number of trajectories may be performed using the backward-forward pass procedure, described above, in addition to the generation of the random start and goal position. In a new map, the method generates a random goal, finds the state value function, reward and motion policy of the dynamic objects/individuals with the backward pass, and then simulates the trajectories to reach that goal point from the random start position using the forward pass. This is repeated for a given number of times (for instance, 100-1000, particularly 500 pairs of random start and goal points). These simulated trajectories yield visitation counts in the new map, which are then normalized to get the occupancy prior distribution as an input to the robot motion planning.

Particularly, the state value function for the trajectory may be developed by means of a softmax function.

According to a further aspect of the present invention, a device, particularly a control unit of a mobile robot is provided for determining a motion trajectory for the mobile robot based on an occupancy prior indicating probabilities of presence of dynamic objects and/or individuals in a map of an environment, wherein the occupancy priors are determined by a reward function defined by reward function parameters; wherein, determining of the reward function parameters, the device is configured to provide a number of semantic maps and a number of training trajectories for each of the number of semantic maps, to compute a gradient as a difference between an expected mean feature count and an empirical mean feature count depending on each of the number of semantic maps and on each of the number of training trajectories, wherein the empirical mean feature count is the average number of features accumulated over the provided training trajectories of the semantic maps, wherein the expected mean feature count is the average number of features accumulated by trajectories generated depending on the current reward function parameters; and to update the reward function parameters depending on the gradient.

BRIEF DESCRIPTION OF THE DRAWINGS

Example embodiments of the present invention are described in more detail in conjunction with the figures.

DETAILED DESCRIPTION OF EXAMPLE EMBODIMENTS

Figure 1:
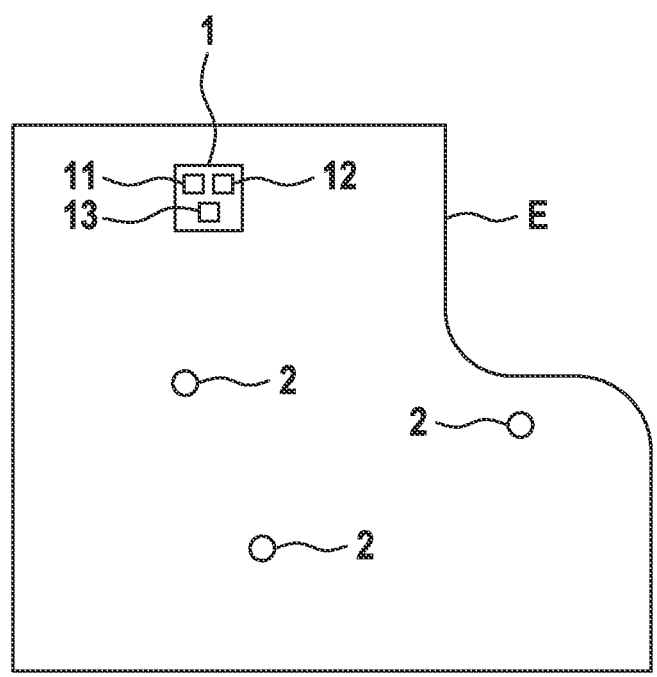
FIG. 1 shows a mobile robot in an environment with further individuals.

FIG. 1 shows a system of a mobile robot 1 having a task to move through an environment E from position A to position B along a trajectory. In the environment E, dynamic objects and/or individuals 2 may move performing their own tasks. The dynamic objects and/or individuals 2 may each show a kind of intelligent or task driven behavior wherein the probability of presence in different areas of the environment may be indicated by a semantic map of the environment.

A semantic map as understood herein is based on a segmentation of an environment map. An environment map is an areal or spatial representation of a real environment in which the mobile robot shall move. The segmentation associates to regions or areas of the environment and/or of the environment map The mobile robot may be an autonomous cleaning robot, an autonomous lawn mower, an autonomous service or care robot or the like.

The mobile robot 1 may have a configuration as it is schematically shown in FIG. 1. The mobile robot 1 has a control unit 11 that is configured to perform the subsequently described method and to control movement of the robot 1 along a planned trajectory.

The control unit 11 may have a microprocessor or a microcontroller as well as a memory for storing data and an algorithm code. Furthermore, the mobile robot 1 has an actuation unit 12 for interaction with the environment, for instance the actuation unit 12 may include a traction motor for driving wheels of the mobile robot 1 to move the mobile robot 1 within the environment E. The actuation unit 12 is controlled by the control unit 11.

Furthermore, the mobile robot 1 may include a sensor system 13 for sensing the environment E, particularly to detect other objects and structures which may allow the localization of the mobile robot 1 and locations of the dynamic objects in the environment E such that their positions or their poses are known in the environment E. The sensor system 13 may include radar, Lidar, and/or cameras to scan the environment E surrounding the mobile robot 1.

The control unit 11 is configured to move the mobile robot 1 along a planned trajectory which can be determined by a Markov decision process.

A Markov decision process is used to express the dynamics of a decision-making process and is defined by a tuple ($\mathcal{T}$, $\mathcal{A}$, $\mathcal{T}$, $\mathcal{R}$) of states $s \in \mathcal{S}$, actions $a \in \mathcal{A}$, probabilistic state transition mapping $\mathcal{T}: \mathcal{S} \times \mathcal{A} \rightarrow \mathcal{S}$, and a reward function $\mathcal{R}: \mathcal{S} \times \mathcal{A} \rightarrow \mathcal{R}$ mapping state transitions to reward values. A state, as understood herein, defines a location/position and may further comprise some internal states of a dynamic object/individual 2. $f(s)$ encodes the semantics of a state, i.e. which semantic class or probabilistic combination thereof it belongs to. Probabilities may come from uncertainty of semantic environment segmentation. For simplicity, it may be assumed that the semantics $f(s)$ of each state s is equal to its most likely class. However, also probability values for $f_k(s)$ can be assumed.

A policy $\pi: \mathcal{S} \rightarrow \mathcal{A}$ maps states s to actions a and represents a decision-making process by encoding the distribution of an action a to take when in state s. The optimal policy maximizes the expected cumulative reward, $$\pi^*(s_i) = \operatorname*{argmax}_{\pi} \mathbb{E}_{\pi} \left[ \sum_{t=i}^{T} \mathcal{R}(s_t, a_t) \right]$$

In practice, the anticipated reward of taking action $a_t$ when in state $s_t$ is represented by a state-action value function $Q(s_t, a_t)$. Maximizing over the set of possible actions results in the state value function $V(s_t)$ and optimal policy, $$V(s_t) = \max_{a_t} Q(s_t, a_t)$$

$$\pi(s_t) = \operatorname*{argmax}_{a_t} Q(s_t, a_t)$$

Equivalently, the optimal policy satisfies the Bellman equation $$Q(s_t, a_t) = \mathbb{E}\ [V(s_{t+i})|s_t, a_t] + \mathcal{R}(s_t, a_t)$$

which can be obtained with value iteration—a dynamic programming algorithm that iteratively computes $V(s_t)$ and $Q(s_t, a_t)$ to obtain the cumulative expected rewards of the optimal policy when starting from state $s_1$.

Inverse Optimal Control (IOC) frameworks deal with modeling optimal behavior of a robot, operating in a stochastic world $\mathcal{S}$ (set of states) and collecting rewards $\mathcal{R}$ on the way to their goal state $s_g \in \mathcal{S}$. Inverse Optimal Control is capable of balancing immediate rewards and future expected rewards when composing the policy. In an inverse optimal control problem, the reward function $\mathcal{R}(s_t, a_t)$ is not given and must be discovered/developed from demonstrated examples, i.e. from a set of observations T corresponding to motion trajectories of dynamic objects and/or individuals 2 in given environments (represented by environment maps). Various approaches using structured maximum margin prediction, feature matching and maximum entropy Inverse Reinforcement Learning have been proposed for recovering the reward function. The reward function in general has the form $$r(s, \theta) = r_0 + \theta^T f(s)$$

and is assumed to be a weighted combination of feature responses $f(s) = [f_1(s) \ldots f_K(s)]$, where each $f_k(s)$ is the response of a physical scene feature, wherein $f_k(s)$ indicates a measure that the state s belongs to the semantic class k. The measure is one if the state s definitely belongs to the semantic class k. Semantic classes for natural urban environment may include semantics such as pavement, grass, road surface, crosswalk, obstacle, parking lot, water, bush or the like.

$\theta$ is a vector of weights representing the reward function parameters defining the reward function. By learning the reward function parameters, it is learned how much a physical scene feature/semantic class affects the action of a dynamic object or an individual 2. For example, in road navigation, a feature such as presence of a car or a building, will have large weights because they are high cost/low rewards and should be avoided.

Basically, a suitable motion trajectory for controlling the mobile robot 1 is determined based on occupancy map priors of moving dynamic objects or individuals 2 in semantically-rich urban environments. Given a map of the environment M with associated feature responses $$f(s) = [f_1(s) .. f_K(s)] \sum_{k=1}^{K} f_k(s) = 1$$

for each states $s \in \mathcal{M}$ over the set of K semantic classes, the prior probability p(s) of observing a dynamic object/individual 2 is estimated in this state s.

Commonly, the problem of estimating p(s) can be solved by counting visitation frequencies in each state applying a large database of trajectories $\mathcal{T}_\mathcal{M}$ in $\mathcal{M}$:

$$p(s) = \left.\frac{D(s)}{\sum_{s' \in \mathcal{M}} D(s')}\right|_{\mathcal{T}_\mathcal{M}}$$

where D(s) is a visitation count (hits of locations within map by each of the trajectories) of state s among trajectories $\mathcal{T}_\mathcal{M}$. However, herein the distribution of visitation counts shall be estimated in environments where no trajectory data $\mathcal{T}_\mathcal{M}$ but only semantic maps are available.

A semantic map of the environment f(M), or a method to extract it, is generally known by a process of semantic scene labeling. Recent semantic scene labeling approaches provide a robust and reliable way of recognizing physical scene features corresponding to semantic classes such as e.g. pavement, grass, tree, building and car, e.g. for navigational purposes.

Figure 2:
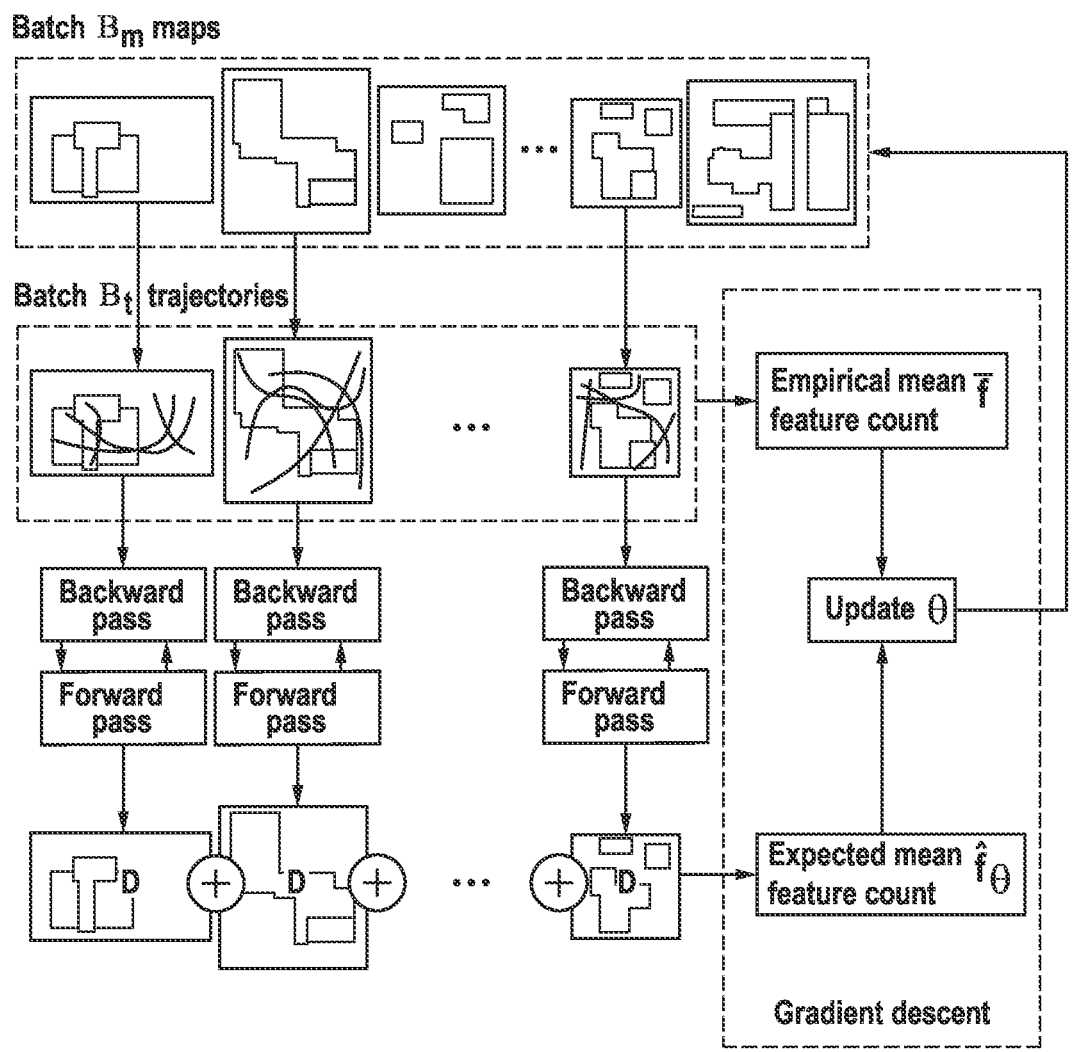
FIG. 2 shows an illustration for determining an occupancy prior distribution used for controlling the mobile robot of FIG. 1, in accordance with an example embodiment of the present invention.
Figure 3:
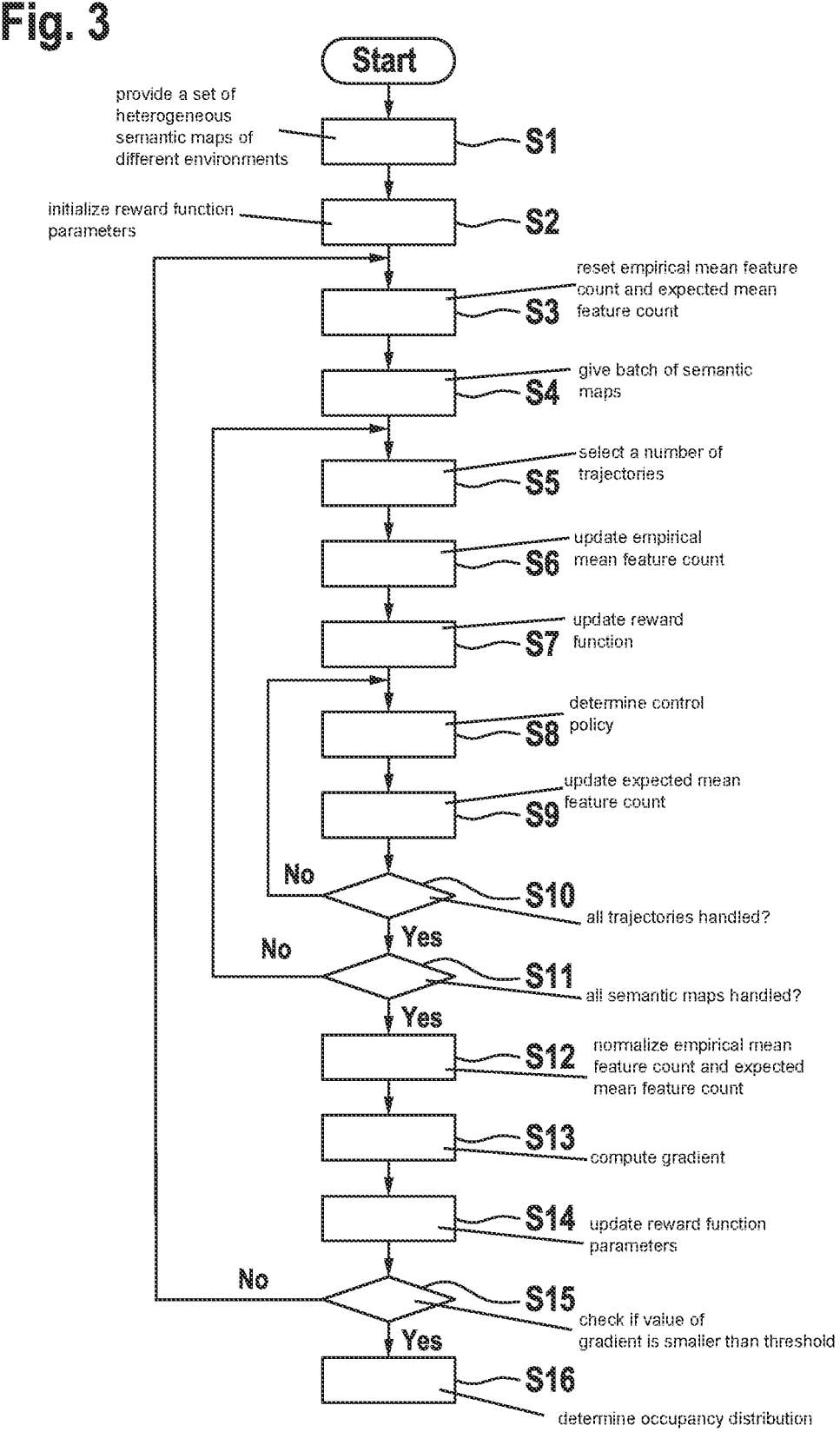
FIG. 3 shows a flowchart illustrating the method steps for controlling the mobile robot based on the reward function of dynamic objects/individuals in the given environment, in accordance with an example embodiment of the present invention.

The method for controlling a mobile robot 1 depending on a reward function derived from a number of given semantic maps is described in conjunction with FIGS. 2 and 3. FIG. 2 shows schematically the function blocks of the reward function determining method, and FIG. 3 a flowchart illustration the method steps for controlling the mobile robot 1 including for determining the reward function. The method is performed in the control unit 11 of the mobile robot 1 or in any other data processing unit where the method may be implemented as an algorithm in hardware and/or software.

In step S1, a set of heterogeneous semantic maps of different environments is provided. For each semantic map a number of training trajectories T is provided which may be selected randomly from the set of demonstrations. Each semantic map associates one or more features to a map location representing a situation at a corresponding location in an environment. Particularly, the features represent an indication about the presence or non-presence of an object, a structure or the like. The semantic maps may be developed according to known processes e.g. depending on camera data obtained by the mobile robot 1 or any other imaging system being in connection therewith, including picture databases, external cameras and the like.

In the following steps a method is described to use the semantic maps for developing the reward function being the basis for determining motion trajectory of the mobile robot 1. Basically, the reward function defines occupancy priors which are derived in a new environment by learning from sample environments.

The process of determining the reward function is indicated by the pseudocode as follows:

1: $\theta \leftarrow 1/K$
2: repeat
3: $\hat{f}_\theta \leftarrow 0, \tilde{f} \leftarrow 0$
4: Batch $B_m$ maps
   for m=1, ..., $B_m$, do
6:   $\mathcal{T} \leftarrow$ Batch $B_t$ trajectories from $\mathcal{M}_m$ 7: $\tilde{f} \leftarrow \tilde{f} + \frac{1}{|\mathcal{T}|}\sum_i^{|\mathcal{T}|} f(\mathcal{T}^i)$ 8:   $\mathcal{R}(s, \theta) \leftarrow r_0 + \theta^T f(s)$
9:   for i=1, ..., $B_t$ do
10:    $\pi \leftarrow$ BackwardPass($s_g$)
11:    $\hat{f}_\theta \leftarrow \hat{f}_\theta +$ ForwardPass($s_0, \pi$)
12:  $\tilde{f}$ normalize($\tilde{f}$)
13:  $\hat{f}_\theta \leftarrow$ normalize($\hat{f}_\theta$)
14:  $\nabla\mathcal{L}_\theta \leftarrow \tilde{f} - \hat{f}_\theta$
15:  $\theta \leftarrow \theta e^{\lambda \nabla \mathcal{L}_\theta}$
16: until $\|\nabla\mathcal{L}_\theta\| < \epsilon$ In step S2 (line 1), the reward function parameters θ are initialized with the reciprocal value of the number of distinguished features K (number of semantic classes).

In line 2, a loop will be started for updating the reward function parameters θ in iterations. In each iteration following steps are carried out until in step S15 it is determined that the process converged.

In step S3 (line 3), an empirical mean feature count $\tilde{f}$ and an expected mean feature count $\hat{f}_\theta$ are resetted.

In step S4 (line 4), a batch of semantic maps $\mathcal{M}_m$ of same or different environments is given based on which the empirical mean feature count $\tilde{f}$ and the expected mean feature count $\hat{f}_\theta$ shall be determined to obtain a gradient for updating the reward function parameters θ. $B_m$ indicates the number of maps $\mathcal{M}_m$ in the batch.

In line 5, a loop is started where for each of the semantic maps $\mathcal{M}_{1 ... B_m}$ following steps are performed.

In step S5, therefore, a number $B_t$ of trajectories are selected from the training data T provided in conjunction with a first/selected of the semantic maps $\mathcal{M}_m$.

In step S6 (line 7), the empirical mean feature count $\tilde{f}$ is updated according to $$\tilde{f} \leftarrow \tilde{f} + \frac{1}{|\mathcal{T}|}\sum_i^{|\mathcal{T}|} f(\mathcal{T}^i)$$

The empirical mean feature count $\tilde{f}$ corresponds to the average number of features accumulated over the (considered) training trajectories of the semantic maps.

In step S7 (line 8), the reward function is updated according to $$\mathcal{R}(s,\theta) = r_0 + \theta^T f(s)$$

based on initially set or previously determined reward function parameters θ. $r_0$ is a base reward of a transition.

In line 9, a loop is started for considering each of the batch $B_t$ of trajectories.

In step S8 (line 10), a control policy it is determined based on a backward-pass-process "BackwardPass" as described farther below. The control policy corresponds to a set of rules that can be used to control actions of the mobile robot 1 in the real world environment.

In step S9 (line 11), the expected mean feature count $\hat{f}_\theta$ is updated based on the control policy π in a forward-pass algorithm "ForwardPass" as described below. The expected mean feature count $\hat{f}_\theta$ is the average number of features accumulated by trajectories generated depending on the current reward function parameters.

In step S10, it is checked if all trajectories of the batch $B_t$ of trajectories are handled by the loop. If positive (alternative: yes), the process is continued with step S11. Otherwise (alternative: no) the process returns to step S8.

In step S11, it is checked if all semantic maps of the batch $B_m$ of semantic maps have been handled by the loop. If positive (alternative: yes), the process is continued with step S12. Otherwise (alternative: no), the process returns to step S5.

In step S12 (lines 12 and 13), the empirical mean feature count $\tilde{f}$ and the expected mean feature count are normalized to make them comparable.

In step S13 (line 14), a gradient $\nabla \mathcal{L}_\theta$ is computed as a difference between the empirical mean feature count $\tilde{f}$ and the expected mean feature count $\hat{f}_\theta$.

In step S14 (line 15), the reward function parameters θ are updated based on the gradient $\nabla \mathcal{L}_\theta$ according to $\theta \leftarrow \theta e^{\lambda \nabla \mathcal{L}_\theta}$ with Δ being a given learning rate to be empirically set.

In step S15, it is checked if the value of the gradient $\nabla \mathcal{L}_\theta$ is smaller than a given threshold ϵ indicating a sufficient convergence of the iterations. If positive (alternative: yes), the process is continued with step S16, otherwise it is returned to step S3.

In step S16, an occupancy distribution is determined based on the reward function, e.g. by using the backward-forward pass procedure, as described above, in addition to the generation of a random start state $s_0$ (which includes the start position) and a random goal state $s_g$ (which includes the goal position). In a new map, the method generates a random goal state, finds the state value function, reward and motion policy of the dynamic objects/individuals 2 with the backward pass, and then simulates the trajectories to reach that goal state from the random start state using the forward pass. This is repeated for a given number of times (for instance, 500 pairs of random start and goal points). These simulated trajectories yield visitation counts in the new map, which are then normalized to get the occupancy prior distribution as an input to the robot motion planning.

Based on the occupancy distribution, a motion trajectory is determined. For instance, Dijkstra, A* or RRT are some usual methods which operate on a cost-map, wherein the prior occupancy distributions can be used as part of the cost-map.

Figure 4:
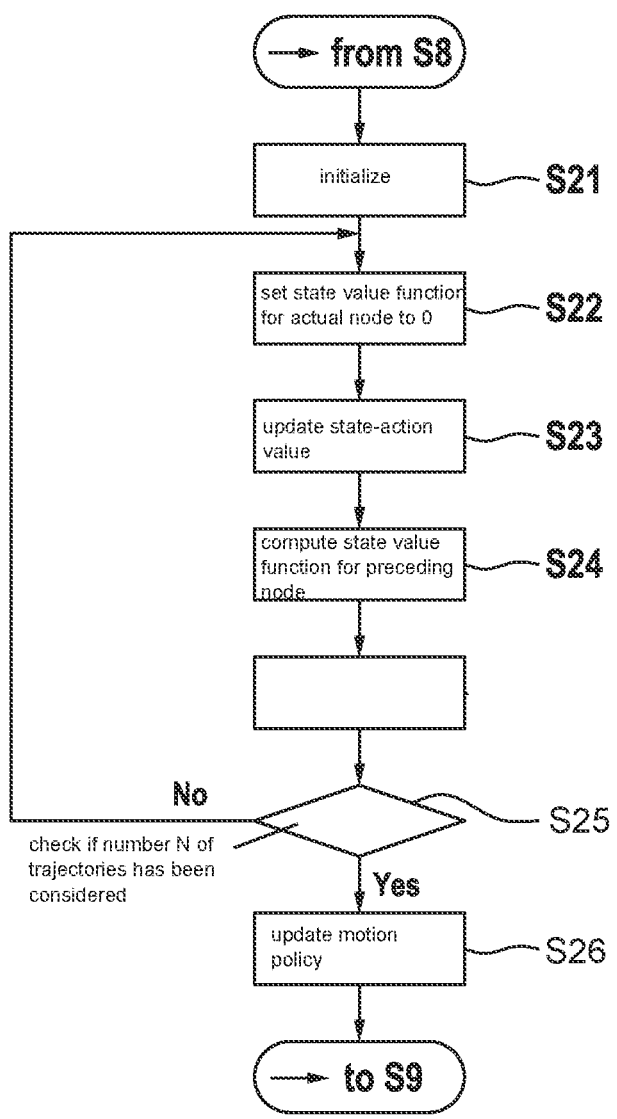
FIG. 4 shows a flowchart illustrating a backward-pass process as a sub-routine for the process of FIG. 3, in accordance with an example embodiment of the present invention.

The backward-pass process is explained in detail in conjunction with the flowchart of FIG. 4. The process is additionally illustrated by the following pseudocode:

1: function BackwardPass($\mathcal{T}_\mathcal{M}^i$, θ)
2: V(s)←−∞
3: for n=N, . . . , 1 do
4: $V^{(n)}(s^g) \leftarrow 0$
5: $Q^{(n)}(s, a) \leftarrow \mathcal{R}(s, \theta) + \mathbb{E}_{p_{sa}^{s'}}[V^{(n)}(s')]$
6: $V^{(n-1)}(s) \leftarrow \text{softmax}_a Q^{(n)}(s, a)$
7: $\pi(a|s) \leftarrow e^{\alpha(Q(s,a) - V(s))}$
8: return π

In the backward-pass process, the current reward function parameters θ are used and the expected reward of a trajectory is computed ending in a given goal sg and starting. Essentially, the expected reward is computed to the goal from every possible starting location. The algorithm revolves around the repeated computation of the state value function V(s) and the state-action value function Q(s,a). Intuitively, V (s) is a soft estimate of the expected reward of reaching the goal from state s, and Q(s,a) is the soft expected reward of reaching the goal after taking action a from the current state s. Upon convergence, the maximum entropy policy is $\pi_\theta(a|s) = e^{\alpha^*Q(s,a) - V(s))}$.

The backward-pass process starts with step S21 (line 2) where each element of the state value function V(s) is initialized to a low value such as −∞.

In line 3, a loop is started where a trajectory is provided as one of the training trajectories T of the respective map starting with a given goal state $s_g$ which is the final state of the trajectory.

In step S22 (line 4), the state value function for the actual node of the trajectory is set to 0:

$$V^{(n)}(s_g) = 0$$

In step S23 (line 5), the state-action value function $Q^{(n)}(s,a)$ for the actual trajectory node is updated by the actual reward function and $\mathbb{E}[V(s_{t+1})|s_t, a_t]$ according to the Bellmann equation $$Q^{(n)}(s,a) = \mathbb{E}[V^{(n)}(s')|s,a] + \mathcal{R}(s, \theta)$$

$\mathbb{E}[V(s_{t+1})|s_t, a_t]$ corresponds to an expected reward received in the state $s_{t+1}$. The Bellmann equation for Q function simply tries every action a in the current state s and evaluates their effects based on the value of the next state $s_{t+1}$, reached by executing action a in the current state state $s_t$.

In step S24, the state value function for a preceding node n−1 is computed $$V^{(n-1)}(s_g) = \text{softmax}_a Q^{(n)}(s,a)$$

In step S25, it is checked if a number N of trajectory nodes has been considered. The number N is a predetermined parameter and corresponds to the number of time steps considered for a trajectory time horizon. In very complex environments with a stochastic transition function, executing action a in state $s_t$ may result in different resulting states $s_{t+1}$, higher N may give a better estimation of the V function. However, iterating for a large N also requires more runtime. If positive (alternative: yes), the process is continued by step S26. Otherwise (alternative: no), the process is continued with step S22.

In step S26, the motion policy is updated as follows:

$$\pi(s,a) \leftarrow e^{\alpha(Q(s,a) - V(s))}$$

α corresponds to is a predetermined stochastic motion policy parameter—a higher α means a more focused policy with less probability of sub-optimal actions.

The backward pass uses the current reward function parameters θ to compute the state value function V (s) for each state s in $\mathcal{M}$ given the goal state $s_g$ which is the final state of the trajectory $$\mathcal{T}^i_\mathcal{M} \in \mathcal{T}_\mathcal{M}$$

A stochastic motion policy π(s,a) to reach sg in $\mathcal{M}$ under $\mathcal{R}(s, \theta)$ is then computed and used in the forward pass to simulate several trajectories from $s_0$ (initial state of $\mathcal{T}^i_\mathcal{M}$) to goal state $s_g$.

Figure 5:
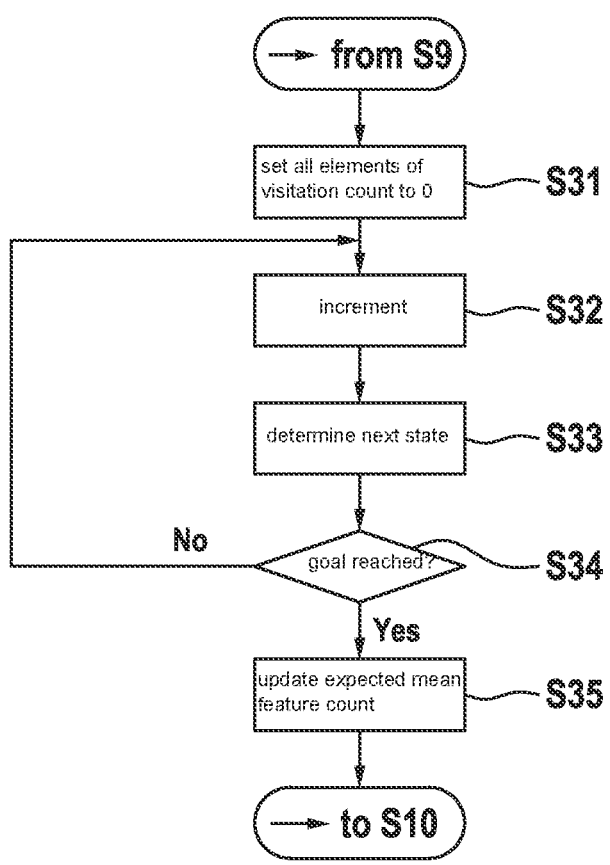
FIG. 5 shows a flowchart illustrating a forward-pass process as a sub-routine for the process of FIG. 3, in accordance with an example embodiment of the present invention.

The forward-pass process is explained in detail in conjunction with the flowchart of FIG. 5. The process is additionally illustrated by the following pseudocode:

1: function ForwardPass($\mathcal{T}_\mathcal{M}^i$, π)
2: D←0
3: for n=1, . . . , N do
4: $s \leftarrow s_0$
5: while $s \neq s_g$ do
6: D(s)←D(s)+1
7: s'←π(a|s)
8: s←s'
9: $\hat{f}_\theta \leftarrow \Sigma_s f(s)D(s)$
10: return $\hat{f}_\theta$ In the following forward pass process an initial distribution is propagated according to the policy π(s,a) learned in the previous backward-pass process. D(s) is defined as the expected state visitation count which is a quantity that expresses the probability of being in a certain state s at time step n.

In step S31 (line 2), all elements of the visitation count D(s) are set to 0.

In line 3, a loop is started developing the considered trajectory from initial state to the goal state according to the policy determined by the preceding backward-pass process thereby developing the visitation count map D(s) indicating for each state in the given map the number of trajectory hits of associated trajectories.

Starting with the initial state, in step S32 (line 6), the visitation count of the actual state is incremented.

In step S33 (line 7), the next state is determined based on the determined policy.

In step S34, it is checked if the goal state is reached. If positive (alternative: yes), the process is continued with step S35, otherwise (alternative: no) the process returns to step S32 considering the next state.

In step S35, the expected mean feature count $\hat{f}_\theta$ is updated according to:

$$\hat{f}_\theta \leftarrow \Sigma_s f(s) D(s)$$

So, the expected mean feature count $\hat{f}_\theta$ is computed as the average number of features accumulated by trajectories generated depending on the current reward function parameters ($\theta$).

What is claimed is:

1. A computer-implemented method for determining a motion trajectory for a mobile robot based on occupancy priors indicating probabilities of presence of dynamic objects and/or individuals in a map of an environment, wherein the occupancy priors are determined by a reward function defined by reward function parameters, the determining of the reward function parameters comprising the following steps:
providing a number of semantic maps;
providing a number of training trajectories for each of the number of semantic maps;
computing a gradient as a difference between an expected mean feature count and an empirical mean feature count depending on each of the number of semantic maps and on each of the number of training trajectories, wherein the empirical mean feature count is a first sum of averages, each of the averages of the first sum being an average number of features accumulated over the provided training trajectories of a different semantic map of a plurality of the semantic maps, and wherein the expected mean feature count is a second sum of averages, each of the averages of the second sum being an average number of features accumulated by trajectories generated, depending on current reward function parameters, for a different semantic map of the plurality of semantic maps; and
updating the reward function parameters depending on the gradient.

2. The method according to claim 1, wherein the determining of the reward function parameters is iteratively performed based on a number of different semantic maps.

3. The method according to claim 1, wherein the reward function indicates how much a physical scene feature affects an action of the dynamic objects and/or individuals.

4. The method according to claim 1, wherein the expected mean feature count is successively developed by a backward-pass process and a forward-pass process for each of the training trajectories of each of the number of semantic maps.

5. The method according to claim 4, wherein the backward-pass process is configured to use the current reward function parameters to compute an expected reward of a trajectory to a goal state of the considered training trajectory from any initial state, wherein a maximum entropy policy is determined.

6. The method according to claim 5, wherein in the backward pass, a state value function is computed wherein a state value function for the trajectory is developed using a softmax function.

7. The method according to claim 4, wherein in the forward-pass process, a trajectory is built based on the policy determined by a preceding backward-pass process while the built trajectory is used to update a visitation count for each state of the built trajectory.

8. A control unit of a mobile robot configured to determine a motion trajectory for the mobile robot based on occupancy priors indicating probabilities of presence of dynamic objects and/or individuals in a map of an environment, wherein the occupancy priors are determined by a reward function defined by reward function parameters, and wherein, for determining of the reward function parameters, the control unit is configured to:
provide a number of semantic maps;
provide a number of training trajectories for each of the number of semantic maps;
compute a gradient as a difference between an expected mean feature count and an empirical mean feature count depending on each of the number of semantic maps and on each of the number of training trajectories, wherein the empirical mean feature count is a first sum of averages, each of the averages of the first sum being an average number of features accumulated over the provided training trajectories of a different semantic map of a plurality of the semantic maps, and wherein the expected mean feature count is a second sum of averages, each of the averages of the second sum being an average number of features accumulated by trajectories generated, for a different semantic map of the plurality of semantic maps, depending on current reward function parameters; and
update the reward function parameters depending on the gradient.

9. A robotic device, comprising:
a control unit control unit configured to determine a motion trajectory for the robotic device based on occupancy priors indicating probabilities of presence of dynamic objects and/or individuals in a map of an environment, wherein the occupancy priors are determined by a reward function defined by reward function parameters, and wherein, for determining of the reward function parameters, the control unit is configured to:
provide a number of semantic maps,
provide a number of training trajectories for each of the number of semantic maps,
compute a gradient as a difference between an expected mean feature count and an empirical mean feature count depending on each of the number of semantic maps and on each of the number of training trajectories, wherein the empirical mean feature count is a first sum of averages, each of the averages of the first sum being an average number of features accumulated over the provided training trajectories of a different semantic map of a plurality of the semantic maps, and wherein the expected mean feature count is a second sum of averages, each of the averages of the second sum being an average number of features accumulated by trajectories generated, for a different semantic map of the plurality of semantic maps, depending on current reward function parameters, and update the reward function parameters depending on the gradient; and an actuation unit for interaction with the environment;

wherein the actuation unit is controlled by the control unit according to the determined motion trajectory.

10. A non-transitory machine readable medium on which are stored instructions, the instructions, when executed by a computer, causing the computer to determine a motion trajectory for a mobile robot based on occupancy priors indicating probabilities of presence of dynamic objects and/or individuals in a map of an environment, wherein the occupancy priors are determined by a reward function defined by reward function parameters, wherein for the determining of the reward function parameters, the instructions cause the computer to perform the following steps:

providing a number of semantic maps;

providing a number of training trajectories for each of the number of semantic maps;

computing a gradient as a difference between an expected mean feature count and an empirical mean feature count depending on each of the number of semantic maps and on each of the number of training trajectories, wherein the empirical mean feature count is a first sum of averages, each of the averages of the first sum being an average number of features accumulated over the provided training trajectories of a different semantic map of a plurality of the semantic maps, and wherein the expected mean feature count is a second sum of averages, each of the averages of the second sum being an average number of features accumulated by trajectories generated, for a different semantic map of the plurality of semantic maps, depending on current reward function parameters; and updating the reward function parameters depending on the gradient.

* * * * *